United States Patent
Chien et al.

(10) Patent No.: US 8,624,574 B2
(45) Date of Patent: *Jan. 7, 2014

(54) PULSE WIDTH MODULATION CONTROLLER OF DC-DC CONVERTER

(71) Applicant: uPI Semiconductor Corporation, Zhubei (TW)

(72) Inventors: Min-Chu Chien, Hsinchu (TW); Yung-Peng Huang, Taipei (TW)

(73) Assignee: UPI Semiconductor Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,640

(22) Filed: Feb. 5, 2013

(65) Prior Publication Data

US 2013/0147456 A1 Jun. 13, 2013

Related U.S. Application Data

(63) Continuation of application No. 12/536,086, filed on Aug. 5, 2009, now Pat. No. 8,395,367.

(51) Int. Cl.
G05F 1/00 (2006.01)

(52) U.S. Cl.
USPC .......................................... 323/288

(58) Field of Classification Search
USPC ................... 323/282, 284, 285, 288
See application file for complete search history.

(56) References Cited

U.S. PATENT DOCUMENTS

| | | | |
|---|---|---|---|
| 6,377,032 B1 | 4/2002 | Andruzzi et al. | |
| 6,583,610 B2 | 6/2003 | Groom et al. | |
| 6,661,214 B1 | 12/2003 | Hann et al. | |
| 2004/0036458 A1 | 2/2004 | Johnson et al. | |
| 2005/0184717 A1* | 8/2005 | Walters | 323/284 |
| 2009/0128110 A1 | 5/2009 | DeLurio et al. | |

* cited by examiner

*Primary Examiner* — Harry Behm
*Assistant Examiner* — Matthew Grubb
(74) *Attorney, Agent, or Firm* — McClure, Qualey & Rodack, LLP

(57) ABSTRACT

A DC-DC converter including a Pulse Width Modulation (PWM) controller for converting an input voltage into an output voltage is provided. The PWM controller includes: an error amplifier, receiving a reference voltage and a feedback voltage and provides an error signal; a compensation unit coupled to an output of the error amplifier, compensating the error signal and comprising a first resister and a first capacitor; a ramp generator, generating a ramp signal according to a constant on time PWM signal; a first comparator coupled to the compensation unit and the ramp generator, comparing the compensated error signal with the ramp signal to generate a trigger signal; and a PWM generator coupled to the first comparator, providing the constant on time PWM signal according to the trigger signal, an input voltage of the DC-DC converter and the output voltage of the DC-DC converter.

11 Claims, 10 Drawing Sheets

# PULSE WIDTH MODULATION CONTROLLER OF DC-DC CONVERTER

This application is a Continuation of pending U.S. patent application Ser. No. 12/536,086, filed Aug. 5, 2009, and entitled "DC-DC Converter with a Constant On-Time Pulse Width Modulation Controller", the entirety of which is incorporated by reference herein.

BACKGROUND OF THE INVENTION

1. Field of the Invention

The invention relates to a controller of a DC-DC converter, and more particularly to a DC-DC converter with a constant on time (COT) pulse width modulation (PWM) controller.

2. Description of the Related Art

DC-DC converters are widely used for various electronic devices. A constant on-time (COT) voltage regulator is one type of DC-DC converter. In general, a COT voltage regulator may turn on a main switch during a fixed period when a feedback voltage is smaller than a reference voltage, and the COT voltage regulator may adjust a turn off period of the main switch so that a steady output voltage may be provided. An output capacitor with a high equivalent series resistance (ESR) disposed in parallel with a load is necessary for a conventional COT voltage regulator, so that a steady output voltage may be provided. However, although a high ESR may help to provide system stability, for a COT voltage regulator, probability of output ripples increase due to the high ESR, which negatively influence the output voltage and power conversion efficiency of the COT voltage regulator.

U.S. Pat. No. 6,583,610 discloses a voltage regulator which operates in ripple-mode and comprises a virtual ripple generator. The virtual ripple generator provides a regulator feedback signal that includes a generated ripple component as a composite signal. The composite signal is generated according to an actual output signal and a ripple signal synchronized to switching cycles of the voltage regulator. Thus, the regulation feedback signal reflects the DC value of the output signal and is responsive to transient changes in the output signal level.

BRIEF SUMMARY OF THE INVENTION

DC-DC converters are provided. An exemplary embodiment of the DC-DC converter for converting an input voltage into an output voltage is provided. The DC-DC converter comprises an input node for receiving the input voltage, an output node for providing the output voltage to a load, an inductor coupled between the output node and a first node, a first transistor coupled between the input node and the first node, a second transistor coupled between the first node and a ground, and a Pulse Width Modulation (PWM) controller. The PWM controller comprises an error amplifier, a first comparator, a PWM generator, and a ramp generator. The error amplifier receives a reference voltage and the output voltage to generate an error signal according to a difference between the reference voltage and the output voltage. The first comparator compares the error signal with a ramp signal to generate a trigger signal. The PWM generator generates a PWM signal with a fixed turn-on time, wherein a frequency of the PWM signal is adjusted according to the trigger signal, the input voltage and the output voltage. The ramp generator generates the ramp signal according to the PWM signal, the input voltage and the output voltage. The PWM controller provides the PWM signal to control the first transistor and the second transistor, so as to convert the input voltage into the output voltage.

Furthermore, another exemplary embodiment of a DC-DC converter for converting an input voltage into an output voltage is provided. The DC-DC converter comprises an input node for receiving the input voltage, an output node for providing the output voltage to a load, an inductor coupled between the output node and a first node, a first transistor coupled between the input node and the first node, a second transistor coupled between the first node and a ground, and a PWM controller. The PWM controller comprises an error amplifier, a sense unit, a compensation unit, a first comparator, a PWM generator, and a ramp generator. The error amplifier receives a reference voltage and the output voltage to generate an error signal according to a difference between the reference voltage and the output voltage. The sense unit senses the inductor to generate a sense current. The compensation unit generates a compensation signal according to the error signal and the sense current. The first comparator compares the compensation signal with a ramp signal to generate a trigger signal. The PWM generator generates a PWM signal with a fixed turn-on time, wherein a frequency of the PWM signal is adjusted according to the trigger signal, the input voltage and the output voltage. The ramp generator generates the ramp signal according to the PWM signal, the input voltage and the output voltage. The PWM controller provides the PWM signal to control the first transistor and the second transistor, so as to convert the input voltage into the output voltage.

Moreover, another exemplary embodiment of a DC-DC converter for converting an input voltage into an output voltage is provided. The DC-DC converter comprises an input node for receiving the input voltage, an output node for providing the output voltage to a load, an inductor coupled between the output node and a first node, a first transistor coupled between the input node and the first node, a second transistor coupled between the first node and a ground, and a PWM controller. The PWM controller comprises an error amplifier, a sense unit, a compensation unit, a first comparator, a PWM generator, and a ramp generator. The error amplifier receives a reference voltage and the output voltage to generate an error signal according to a difference between the reference voltage and the output voltage. The sense unit generates a sense current corresponding to a loading of the load. The compensation unit generates a compensation signal according to the sense current and a ramp signal. The first comparator compares the compensation signal with error signal to generate a trigger signal. The PWM generator generates a PWM signal with a fixed turn-on time, wherein a frequency of the PWM signal is adjusted according to the trigger signal, the input voltage and the output voltage. The ramp generator generates the ramp signal according to the PWM signal, the input voltage and the output voltage. The PWM controller provides the PWM signal to control the first transistor and the second transistor, so as to convert the input voltage into the output voltage.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
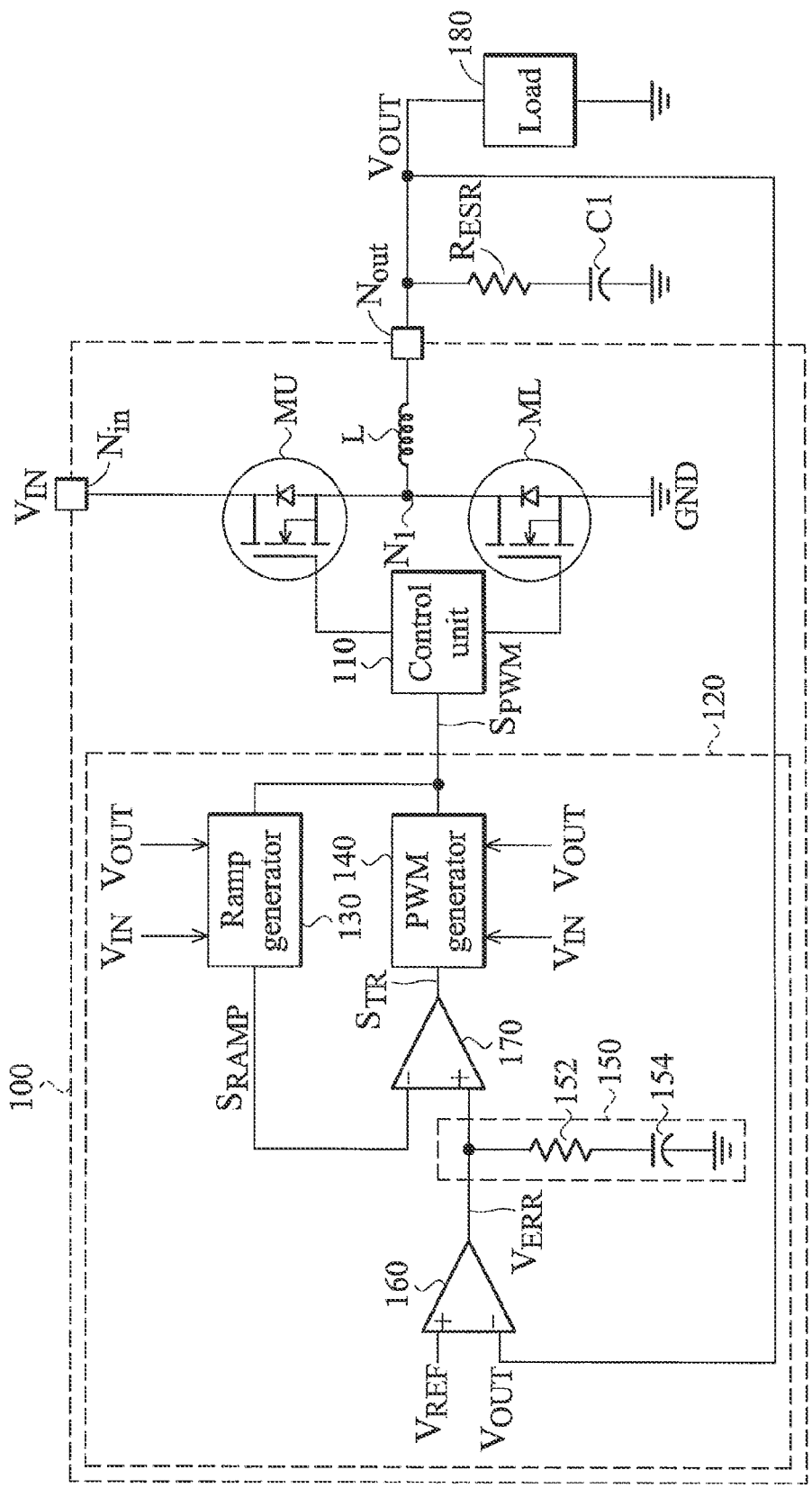
FIG. 1 shows a DC-DC converter according to an embodiment of the invention.

FIG. 1 shows a DC-DC converter 100 according to an embodiment of the invention. The DC-DC converter 100 converts an input voltage $V_{IN}$ received from an input node $N_{in}$ into an output voltage $V_{OUT}$. The DC-DC converter 100 comprises two transistors MU and ML, an inductor L, a control unit 110 and a PWM controller 120. The transistor MU is coupled between the input node $N_{in}$ and a node $N_1$, and the transistor ML is coupled between the node $N_1$ and a ground GND. In this embodiment, the transistors MU and ML are N-type transistors which function as the switches. The control unit 110 receives a pulse width modulation (PWM) signal $S_{PWM}$ provided by the PWM controller 120 and controls the transistors MU and ML to switch on or off according to the PWM signal $S_{PWM}$. The inductor L is coupled between the node $N_1$, and an output node $N_{out}$, wherein the output voltage $V_{OUT}$ is outputted to a load 180 via the output node $N_{out}$. Furthermore, an output capacitor C1 with a lower equivalent series resistance (ESR) is coupled between the $N_{out}$ and the ground GND, and a resistor Resr represents an ESR of the output capacitor C1.

As shown in FIG. 1, the PWM controller 120 comprises a ramp generator 130, a PWM generator 140, a compensation unit 150, an error amplifier 160 and a comparator 170. The error amplifier 160 receives a reference voltage $V_{REF}$ and the output voltage $V_{OUT}$ to generate an error signal $V_{ERR}$ according to a difference between the reference voltage $V_{REF}$ and the output voltage $V_{OUT}$. The compensation unit 150 coupled between an output terminal of the error amplifier 160 and the comparator 170 is used to compensate the error signal $V_{ERR}$, and the compensation unit 150 comprises a resistor 152 coupled to the output terminal of the error amplifier 160 and a capacitor 154 coupled between the resistor 152 and the ground GND. After the error signal $V_{ERR}$ is compensated, the comparator 170 compares the error signal $V_{ERR}$ with a ramp signal $S_{RAMP}$ provided by the ramp generator 130 to generate a trigger signal $S_{TR}$. The PWM generator 140 generates the PWM signal $S_{PWM}$ according to the trigger signal $S_{TR}$, the input voltage $V_{IN}$ and the output voltage $V_{OUT}$. The ramp generator 130 generates the ramp signal $S_{RAMP}$ according to the PWM signal $S_{PWM}$, the input voltage $V_{IN}$ and the output voltage $V_{OUT}$.

Figure 2:
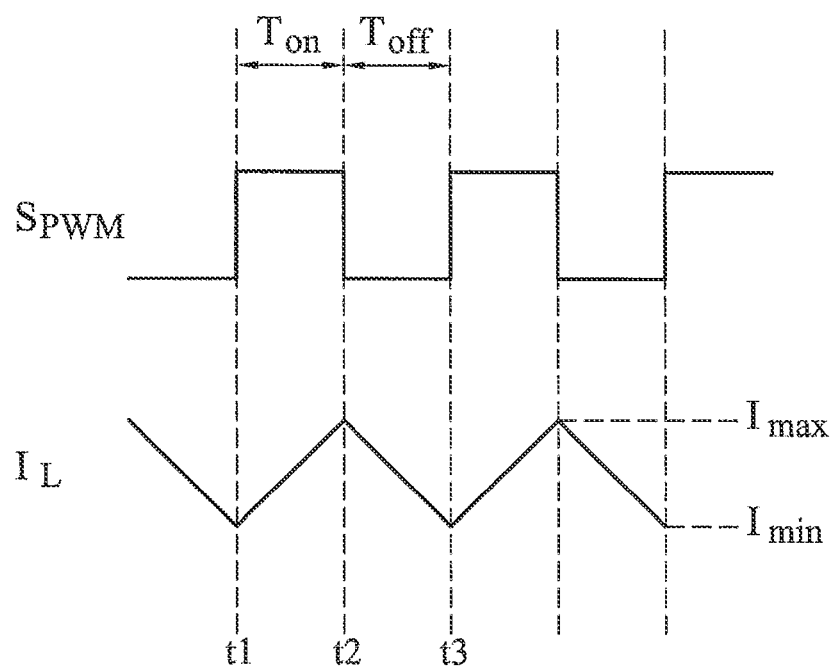
FIG. 2 shows a waveform diagram illustrating the relationship between the PWM signal $S_{PWM}$ and a current $I_L$ flowing through the inductor L of FIG. 1.

FIG. 2 shows a waveform diagram illustrating the relationship between the PWM signal $S_{PWM}$ and a current $I_L$ flowing through the inductor L of FIG. 1. Referring to FIG. 1 and FIG. 2 together, during a period $T_{on}$ (i.e. a turn-on time of the PWM signal), the PWM signal $S_{PWM}$ controls the transistor MU to turn on and controls the transistor ML to turn off. During a period $T_{off}$ (i.e. a turn-off time of the PWM signal), the PWM signal $S_{PWM}$ controls the transistor MU to turn off and controls the transistor ML to turn on. As shown in FIG. 2, the current $I_L$ has a minimum current value $I_{min}$ (ex. $I_{min}$=0) at time t1, and then the current $I_L$ starts to increase and reaches a maximum current value $I_{max}$ at time t2, wherein $I_{max}$=2×$I_{avg}$ and $I_{avg}$ represents an average current value of the current $I_L$. Next, the current $I_L$ starts to decrease and reaches the minimum current value $I_{min}$ at time t3. A rising slope S1 of the current $I_L$ may be given by the following Equation (1):

$$S1 = \frac{V_{IN} - V_{OUT}}{L} = \frac{2 \times I_{avg}}{T_{on}}. \tag{1}$$

According to the Equation (1), the period $T_{on}$ may be given by the following Equation (2):

$$T_{on} = \frac{2 \times I_{avg} \times L}{V_{IN} - V_{OUT}}. \tag{2}$$

In addition, a falling slope S2 of the current $I_L$ may be given by the following Equation (3):

$$|S2| = \frac{V_{OUT}}{L} = \frac{2 \times I_{avg}}{T_{off}}. \tag{3}$$

According to the Equation (3), the period $T_{off}$ may be given by the following Equation (4):

$$T_{off} = \frac{2 \times I_{avg} \times L}{V_{OUT}}. \tag{4}$$

Therefore, according to the Equations (2) and (4), a period T and a frequency $F_{SW}$ of the PWM signal $S_{PWM}$ may be given by the following Equations (5) and (6), respectively:

$$T = T_{on} + T_{off} = 2 \times I_{avg} \times L \left( \frac{1}{V_{IN} - V_{OUT}} + \frac{1}{V_{OUT}} \right); \tag{5}$$

and $$F_{SW} = \frac{1}{T} = \frac{1}{2 \times I_{avg} \times L} \times \frac{(V_{IN} - V_{OUT}) \times V_{OUT}}{V_{IN}}. \tag{6}$$

Suppose that the period $T_{on}$ has a relationship with a ratio of the output voltage $V_{OUT}$ to the input voltage $V_{IN}$, i.e.

$$T_{on} = RCK\left(\frac{V_{OUT}}{V_{IN}}\right),$$

wherein the parameters R, C and K are constant. Therefore, the period $T_{on}$ may be rewritten as the following Equation (7) to obtain the following Equation (8):

$$T_{on} = RCK\left(\frac{V_{OUT}}{V_{IN}}\right) = \frac{2 \times I_{avg} \times L}{V_{IN} - V_{OUT}}; \quad (7)$$

and $$2 \times I_{avg} \times L = RCK\left(\frac{V_{OUT}}{V_{IN}}\right)(V_{IN} - V_{OUT}). \quad (8)$$

According to the Equation (8), the period $T_{off}$ may be rewritten as the following Equation (9):

$$T_{off} = \frac{2 \times I_{avg} \times L}{V_{OUT}} = RCK\left(\frac{V_{IN} - V_{OUT}}{V_{IN}}\right). \quad (9)$$

Thus, according to the Equations (7) and (9), the period T of the PWM signal $S_{PWM}$ may be rewritten as the following Equation (10):

$$T = Ton + Toff \quad (10)$$

$$= RCK\left(\frac{V_{OUT}}{V_{IN}}\right) + RCK\left(\frac{V_{IN} - V_{OUT}}{V_{IN}}\right)$$

$$= RCK.$$

Due to the parameters R, C and K being constant, the period T of the PWM signal $S_{PWM}$ is fixed.

Figure 3A:
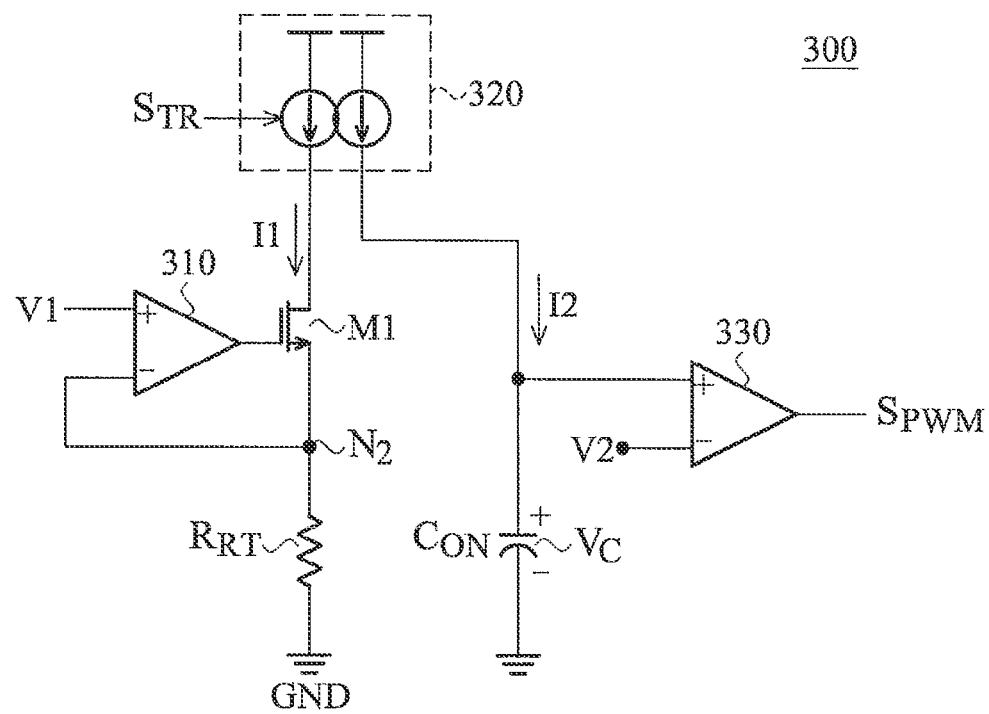
FIG. 3A shows a PWM generator according to an embodiment of the invention.

FIG. 3A shows a PWM generator 300 according to an embodiment of the invention. The PWM generator 300 comprises an amplifier 310, a current generating unit 320, a comparator 330, a transistor MI, a resistor $R_{RT}$ and a capacitor $C_{ON}$. The amplifier 310 has an inverting input terminal coupled to a node $N_2$, a non-inverting input terminal for receiving a voltage V1 and an output terminal coupled to a gate of the transistor M1, wherein the voltage V1 is a voltage in proportion to the input voltage $V_{IN}$, i.e. $V1=K1 \times V_{IN}$. The current generating unit 320 is used as an example for description, and does not limit the invention. For example, the current generating unit 320 may be a current mirror circuit. When the trigger signal $S_{TR}$ is triggered, a current I1 provided by the current generating unit 320 may flow through the transistor MI and the resistor $R_{RT}$, wherein a current value of the current I1 is determined according to the voltage V1 and the resistor $R_{RT}$, ex. $I1=V1/R_{RT}=K1 \times V_{IN}/R_{RT}$. Simultaneously, the capacitor $C_{ON}$ is charged by a current I2 provided by the current generating unit 320 when the trigger signal $S_{TR}$ is triggered. In one embodiment, a current value of the current I2 is equal to that of the current I1, ex. $I2=K1 \times V_{IN}/R_{RT}$. In another embodiment, the current I2 is a current in proportion to the current I1.

Figure 3B:
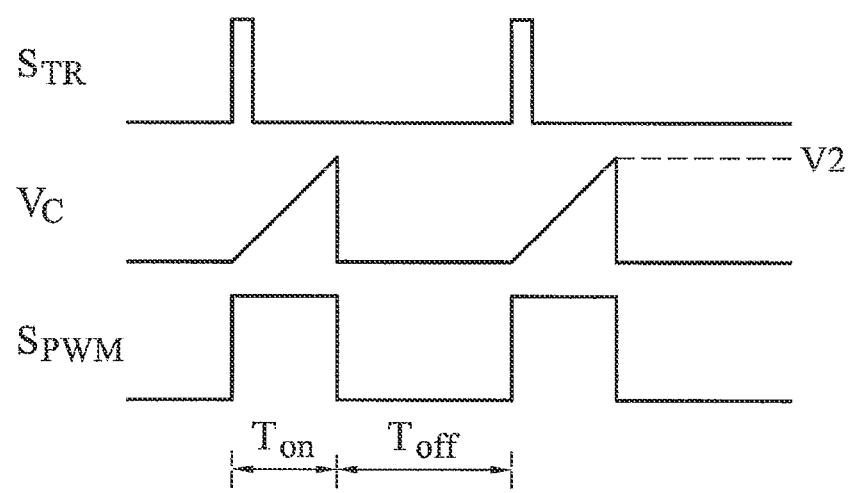
FIG. 3B shows a waveform diagram of the signals in the PWM generator of FIG. 3A.

FIG. 3B shows a waveform diagram of the signals in the PWM generator 300 of FIG. 3A. Referring to FIG. 3A and FIG. 3B together, a voltage Vc represents a voltage across the capacitor $C_{ON}$. The comparator 330 is used to compare the voltage $V_C$ with a voltage V2, wherein the voltage V2 is a voltage in proportion to the output voltage $V_{OUT}$, i.e. $V2=K2 \times V_{OUT}$. When the voltage $V_C$ is smaller than the voltage V2, an active state of the PWM signal $S_{PWM}$ is asserted, i.e. the period $T_{on}$. On the contrary, when the voltage $V_C$ is larger than the voltage V2, an inactive state of the PWM signal $S_{PWM}$ is asserted, i.e. the period $T_{off}$. Therefore, the period $T_{on}$ and the period $T_{off}$ may be given by the following Equations (11) and (12), respectively:

$$T_{on} = \frac{C_{ON}}{I2}dV2 = R_{RT}C_{on}\left(\frac{K2}{K1}\right)\frac{V_{OUT}}{V_{IN}}; \quad (11)$$

and $$Toff = R_{RT}C_{on}\left(\frac{K2}{K1}\right)\frac{V_{IN} - V_{OUT}}{V_{IN}}. \quad (12)$$

Due to the resistor $R_{RT}$, the capacitor $C_{ON}$ and the parameters K1 and K2 being constant, the period $T_{on}$ and the period $T_{off}$ are determined according to the input voltage $V_{IN}$ and the output voltage $V_{OUT}$.

Figure 4A:
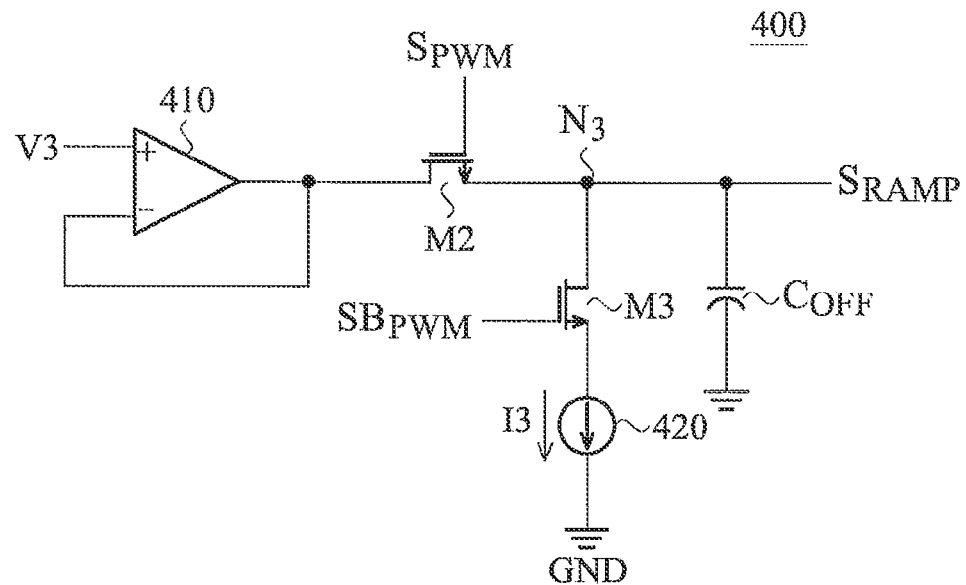
FIG. 4A shows a ramp generator according to an embodiment of the invention.

FIG. 4A shows a ramp generator 400 according to an embodiment of the invention. The ramp generator 400 comprises an amplifier 410, two transistors M2 and M3, a capacitor $C_{OFF}$ and a current source 420. The amplifier 410 has an inveliting input terminal coupled to the transistor M2, a non-inverting input terminal for receiving a voltage V3 and an output terminal coupled to the inverting input terminal, wherein the voltage V3 is a voltage in proportion to a difference between the input voltage $V_{IN}$ and the output voltage $V_{OUT}$, i.e. $V3=K3 \times K1 \times (V_{IN}-V_{OUT})$. The transistor M2 is coupled between the output terminal of the amplifier 410 and a node $N_3$, and the transistor M3 is coupled between the node $N_3$ and the current source 420, wherein the ramp signal $S_{RAMP}$ is a voltage at the node $N_3$. The transistors M2 and M3 are controlled by the PWM signal $S_{PWM}$ and a signal $SB_{PWM}$, respectively, wherein the signal $SB_{PWM}$ is a reversed signal for the PWM signal $S_{PWM}$. Therefore, the transistor M2 is turned on and the transistor M3 is turned off when an active state of the PWM signal $S_{PWM}$ is asserted, and the transistor M2 is turned off and the transistor M3 is trned on when an inactive state of the PWM signal $S_{PWM}$ is asserted.

Figure 4B:
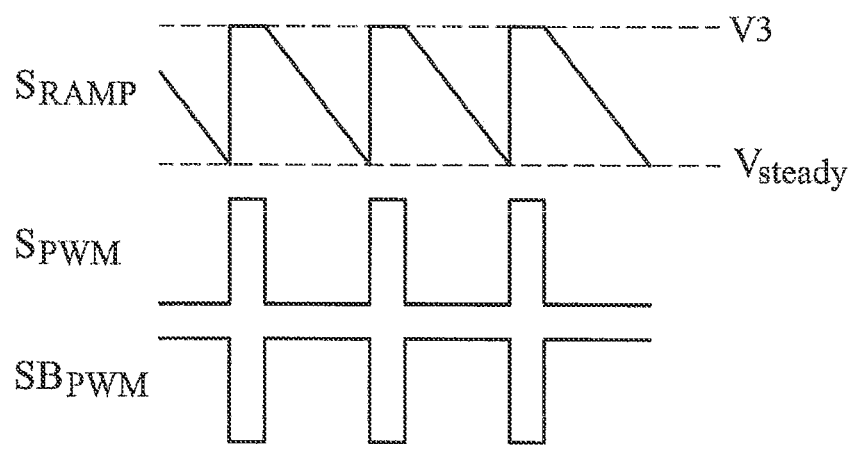
FIG. 4B shows a waveform diagram of the signals in the ramp generator of FIG. 4A.

FIG. 4B shows a waveform diagram of the signals in the ramp generator 400 of FIG. 4A. Referring to FIG. 4A and FIG. 4B together, the ramp signal $S_{RAMP}$ represents the voltage of the node $N_3$, i.e. a voltage across the capacitor $C_{OFF}$. When an active state of the PWM signal $S_{PWM}$ is asserted, the transistor M2 is turned on and the transistor M3 is turned off, such that the capacitor $C_{OFF}$ is charged by the amplifier 410 via the transistor M2, and then the voltage across the capacitor $C_{OFF}$ is charged to a voltage level of the voltage V3. On the contrary, when an inactive state of the PWM signal $S_{PWM}$ is asserted, the transistor M2 is turned off and the transistor M3 is turned on, such that the capacitor $C_{OFF}$ is discharged by the current source 420 via the transistor M3, and then the voltage across the capacitor $C_{OFF}$ is decreased until a subsequent active state of the PWM signal $S_{PWM}$ is asserted. In the embodiment, the current source 420 may sink a current I3 from the node $N_3$ to the ground GND to decrease the ramp signal $S_{RAMP}$, wherein the current I3 corresponds to the input voltage $V_{IN}$. The current source 420 is used as an example, and does not limit the invention. In one embodiment, a current value of the current I3 is equal to that of the current I1 of the PWM generator 300 in FIG. 3A, ex. $I3=K1 \times V_{IN}/R_{RT}$. In another embodiment, the current I3 is a current in proportion to the current U1. Therefore, a voltage variation $dV_{RAMP}$ of the ramp signal $S_{RAMP}$ during the period $T_{off}$ may be given by the following Equation (13):

$$dV_{RAMP} = \frac{I3}{C_{OFF}dT} \quad (13)$$

$$= \frac{K1 \times V_{IN}}{R_{RT} \times C_{OFF}} T_{off}$$

$$= \frac{K1 \times V_{IN}}{R_{RT} \times C_{OFF}} \times R_{RT} C_{ON} \left(\frac{K2}{K1}\right) \frac{V_{IN} - V_{OUT}}{V_{IN}}$$

$$= K2\left(\frac{C_{ON}}{C_{OFF}}\right)(V_{IN} - V_{OUT})$$

$$= V3 - V_{steady},$$

wherein a voltage level $V_{steady}$ represents an ideal steady voltage level of the error signal $V_{ERR}$ in FIG. 1. Therefore, according to the Equation (13), the voltage level $V_{steady}$ of the error signal $V_{ERR}$ may be given by the following Equation (14):

$$V_{steady} = V3 - K2\left(\frac{C_{ON}}{C_{OFF}}\right)(V_{IN} - V_{OUT}) \quad (14)$$

$$= K3 \times K1(V_{IN} - V_{OUT}) - K2\left(\frac{C_{ON}}{C_{OFF}}\right)(V_{IN} - V_{OUT})$$

$$= \left((K3 \times K1) - K2\left(\frac{C_{ON}}{C_{OFF}}\right)\right)(V_{IN} - V_{OUT}).$$

By choosing the parameters K1, K2 and K3 and the capacitors $C_{ON}$ and $C_{OFF}$ appropriately, the error signal $V_{ERR}$ is designed to operate at a direct current (DC) operation voltage level, i.e. the ideal steady voltage level $V_{steady}$.

Referring to FIG. 1, a fine adjustment of the error signal $V_{ERR}$ is automatically performed for a feedback loop of the DC-DC converter 100 according to the determined DC operation voltage level of the error signal $V_{ERR}$, so as to determine a time period that the trigger signal STR is triggered for every period T of the PWM signal $S_{PWM}$, thus obtaining a pseudo fix frequency PWM controller.

Figure 5:
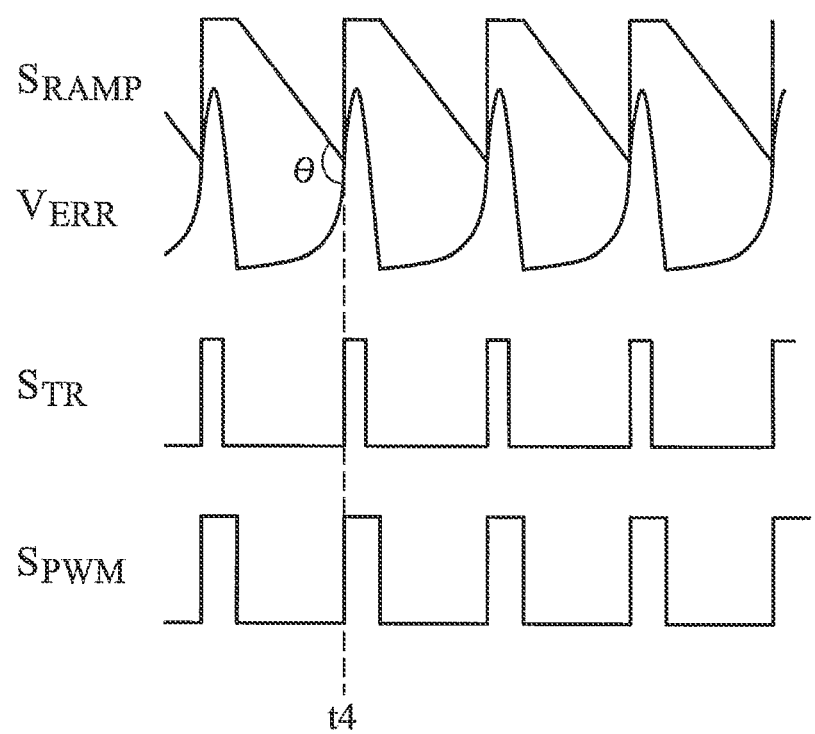
FIG. 5 shows an example illustrating a waveform diagram of the signals of the DC-DC converter of FIG. 1.
Figure 6:
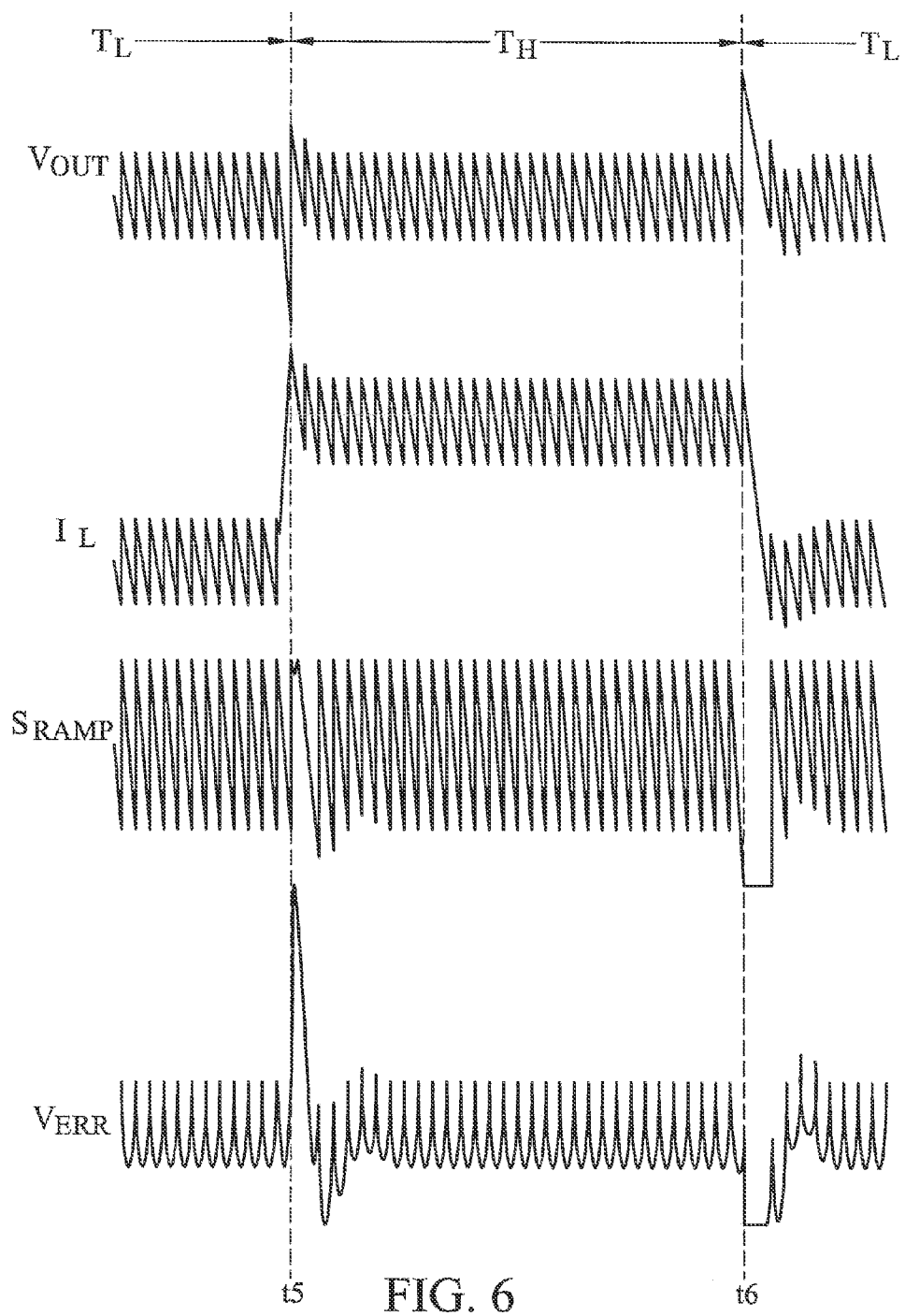
FIG. 6 shows another example illustrating a waveform diagram of the signals of the DC-DC converter of FIG. 1.

FIG. 5 shows an example illustrating a waveform diagram of the signals of the DC-DC converter 100 of FIG. 1. By using the error amplifier 160 to generate the error signal $V_{ERR}$ and comparing the error signal $V_{ERR}$ with the ramp signal $S_{RAMP}$ to adjust a duty cycle of the PWM signal $S_{PWM}$, an included angle θ between the error signal $V_{ERR}$ and the ramp signal $S_{RAMP}$ is large at time t4 and sufficient to avoid noise interference, thus increasing a signal to noise ratio (SNR) thereof. FIG. 6 shows another example illustrating a waveform diagram of the signals of the DC-DC converter 100 of FIG. 1. Referring to FIG. 6 and FIG. 1 together, the period $T_H$ represents that the load 180 has a higher loading, and the period $T_L$ represents that the load 180 has a lower loading. In addition, the load 180 is changed from the lower to higher loading at time t5 and changed from the higher to lower loading at time t6. When the loading of the load 180 is changed, the comparator 170 may immediately adjust the time period that the trigger signal $S_{TR}$ is triggered by comparing the ramp signal $S_{RAMP}$ and the error signal $V_{ERR}$. Therefore, the DC-DC converter 100 may promptly provide the output voltage $V_{OUT}$ in response to the loading of the load 180, thereby increasing system stability.

Figure 7:
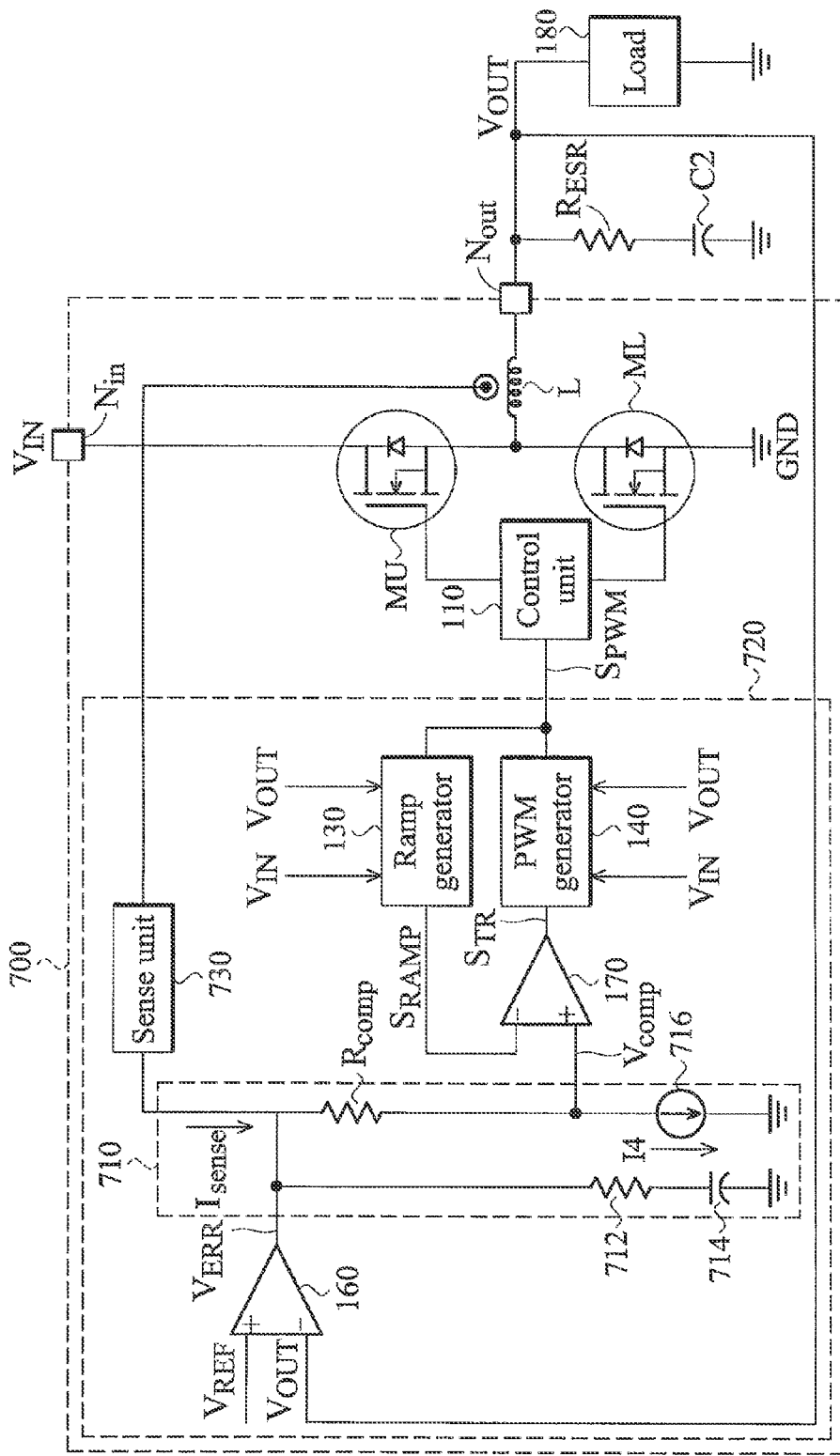
FIG. 7 shows a DC-DC converter according to another embodiment of the invention.

FIG. 7 shows a DC-DC conve1ter 700 according to another embodiment of the invention. The DC-DC converter 700 is applied to a capacitor C2 with a smaller or zero ESR. Compared with the PWM controller 120 of FIG. 1, a PWM controller 720 of the DCDC converter 700 further comprises a sense unit 730 for sensing a current flowing through the inductor L to generate a sense current $I_{sense}$ to a compensation unit 710, wherein the sense current $I_{sense}$ corresponds to the loading of the load 180. The compensation unit 710 comprises a resistor 712, a capacitor 714, a resistor $R_{comp}$ coupled between the error amplifier 160 and the comparator 170, and a current source 716 for sinking a current I4 from the resistor $R_{comp}$ to the ground GND. In one embodiment, the current I4 is a current in proportion to the sense current $I_{sense}$. The current source 716 is used as an example, and does not limit the invention. In the embodiment, a current value of the current I4 is equal to that of the sense current $I_{sense}$. Therefore, a voltage across the resistor $R_{comp}$ is determined according to the sense current $I_{sense}$ and a resistance of the resistor $R_{comp}$. The compensation unit 710 receives the error signal $V_{ERR}$ and generates a compensation signal $V_{COMP}$ to the comparator 170 according to the error signal $V_{ERR}$ and the voltage across the resistor $R_{comp}$, such that the comparator 170 of the PWM controller 720 may compare the compensation signal $V_{COMP}$ with the ramp signal $S_{RAMP}$ provided by the ramp generator 130 to generate the trigger signal $S_{TR}$. The compensation signal $V_{COMP}$ comprises a feedback signal from the output voltage $V_{OUT}$ associated with a feedback signal from the current flowing through the inductor L, thus avoiding harmonic oscillation and assuring that the output voltage $V_{OUT}$ is stabilized when the capacitor C2 with a smaller ESR. In addition, by adjusting the resistor $R_{comp}$ or detecting a gain of the sense current $I_{sense}$, a gain of a current loop component is adjusted to increase system stability.

Figure 8:
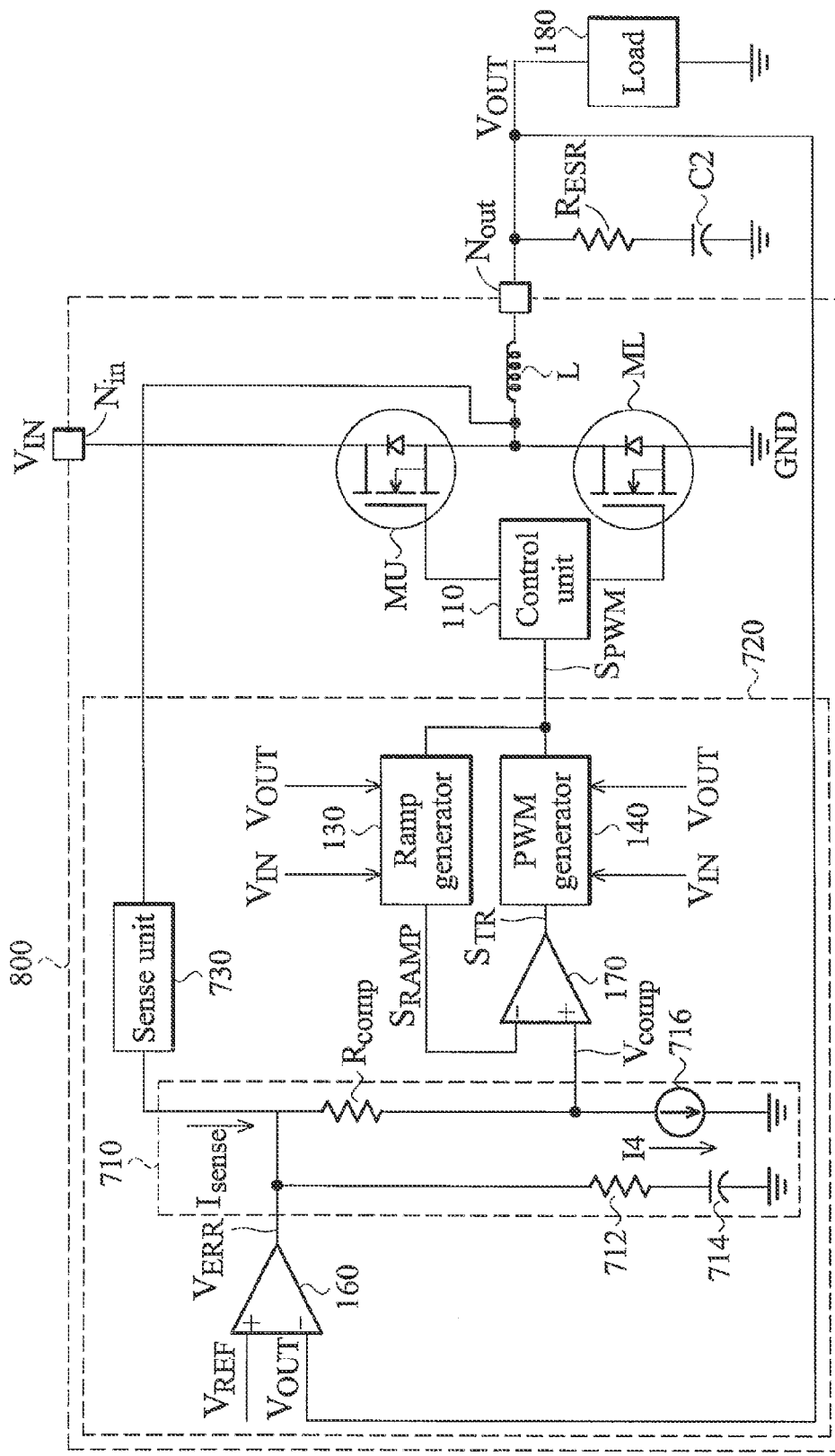
FIG. 8 shows a DC-DC converter according to another embodiment of the invention.

FIG. 8 shows a DC-DC converter 800 according to another embodiment of the invention. Compared with the DC-DC converter 700 of FIG. 7, the sense unit 730 of the DC-DC conve1ter 800 is coupled to a node between the transistor MU and the transistor ML, and senses a current flowing through the transistor ML to generate the sense current $I_{sense}$. Similarly, the sense current $I_{sense}$ provided by the sense unit 830 corresponds to the loading of the load 180.

Figure 9:
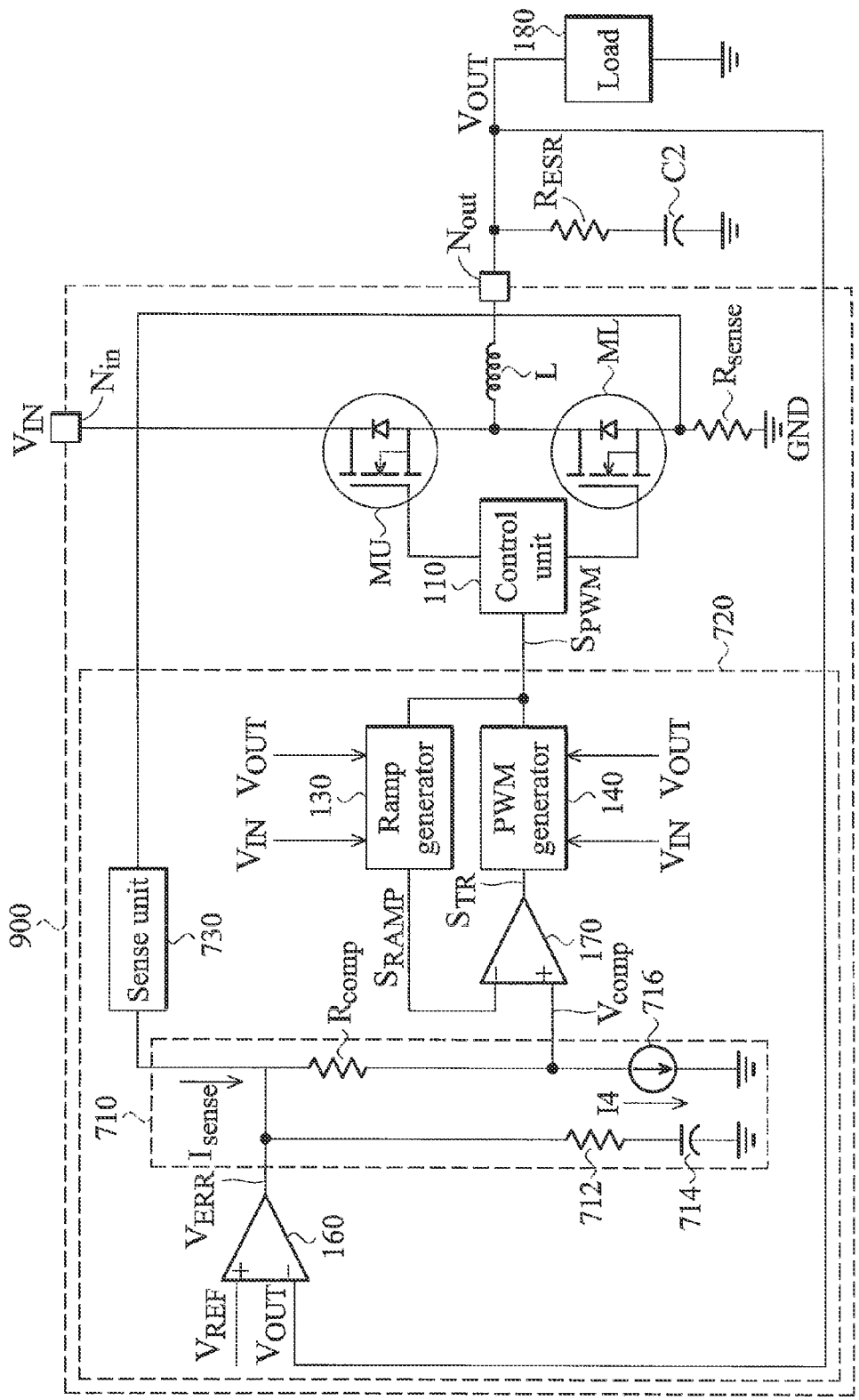
FIG. 9 shows a DC-DC converter according to another embodiment of the invention.

FIG. 9 shows a DC-DC converter 900 according to another embodiment of the invention. Compared with the DC-DC converter 700 of FIG. 7, the DC-DC converter 900 further comprises a resistor $R_{sense}$ coupled between the transistor ML and the ground GND. Furthermore, the sense unit 730 of the DC-DC converter 900 is coupled to the resistor $R_{sense}$, and senses a current flowing through the resistor $R_{sense}$ to generate the sense current $I_{sense}$. Similarly, the sense current $I_{sense}$ provided by the sense unit 930 corresponds to the loading of the load 180.

Figure 10:
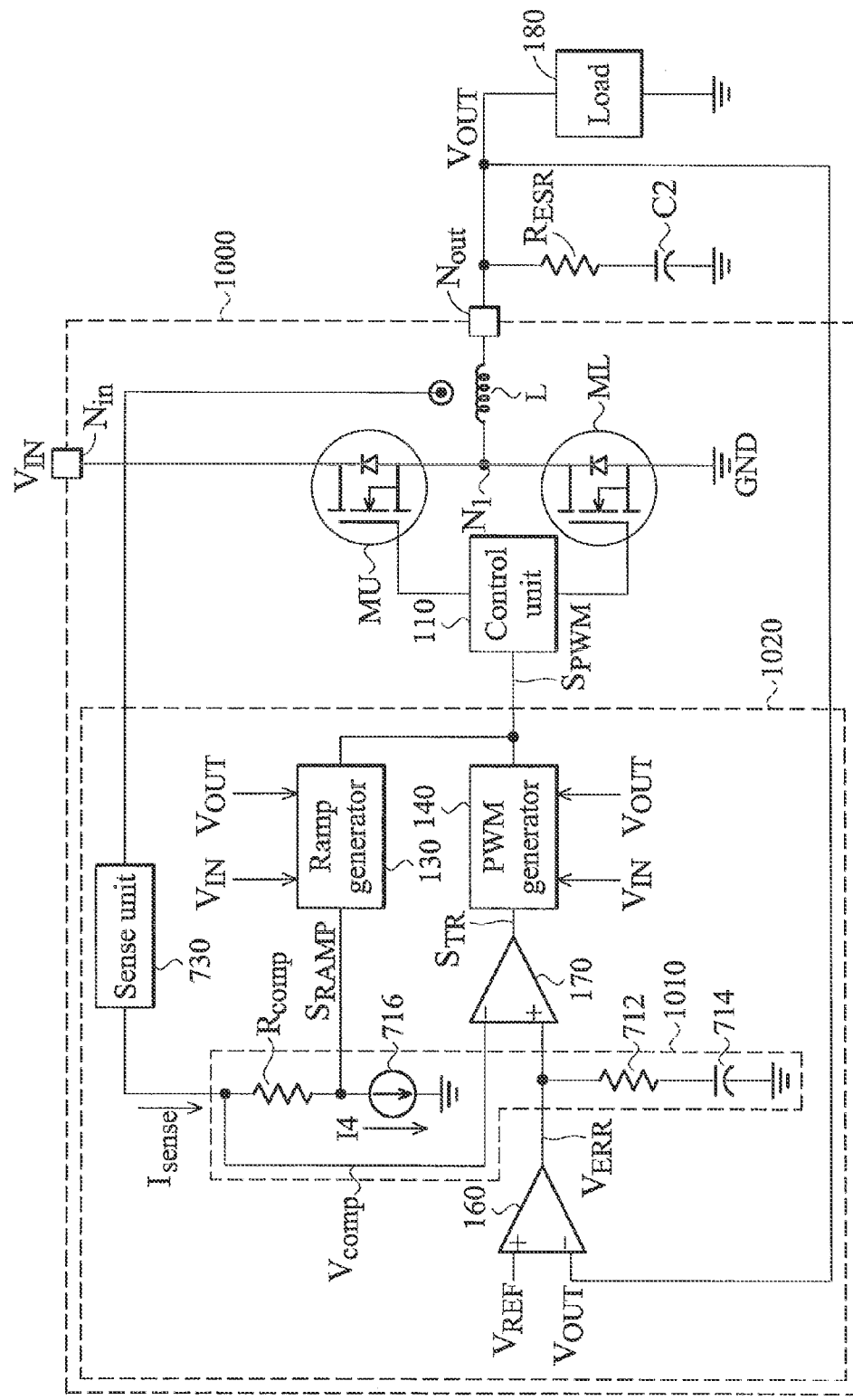
FIG. 10 shows a DC-DC converter according to another embodiment of the invention.

FIG. 10 shows a DC-DC converter 1000 according to another embodiment of the invention. In a PWM controller 1020 of the DC-DC converter 1000, the comparator 170 compares the error signal $V_{ERR}$ with a compensation signal $V_{comp}$ provided by a compensation unit 1010 to generate the trigger signal $S_{TR}$. In the embodiment, the sense unit 730 senses a current flowing through the inductor L to generate the sense current $I_{sense}$, wherein the sense current $I_{sense}$ corresponds to the loading of the load 180. In one embodiment, the sense unit 730 may sense a current flowing through the transistor ML to generate the sense current $I_{sense}$. In another embodiment, the DC-DC converter 1000 further comprises a resistor coupled between the transistor ML and the ground GND, e.g. the resistor $R_{sense}$ of FIG. 9, and the sense unit 730 may sense a current flowing through the resistor to generate the sense current $I_{sense}$. The compensation unit 1010 comprises the resistor 712, the capacitor 714, a resistor $R_{comp}$ coupled between the sense unit 730 and the ramp generator 130, and a current source 716 for sinking a current I4 from the resistor $R_{comp}$ to the ground GND. Therefore, the compensation unit 1010 generates the compensation signal $V_{COMP}$ to the comparator 170 according to the sense current $I_{sense}$, a voltage across the resistor $R_{comp}$ and the ramp signal $S_{RAMP}$. Similarly, the compensation signal $V_{COMP}$ comprises a feedback signal from the output voltage $V_{OUT}$ associated with a feedback signal from the current flowing through the inductor L, thus avoiding harmonic oscillation and assuring that the output voltage $V_{OUT}$ is stabilized when the capacitor C2 with a smaller ESR. In addition, by adjusting the resistor $R_{comp}$ or detecting a gain of the sense current $I_{sense}$, a gain of a current loop component is adjusted to increase system stability.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Pulse Width Modulation (PWM) controller of a DC-DC converter, comprising:
   an error amplifier, receiving a reference voltage and a feedback voltage corresponding to an output voltage of the DC-DC converter to provide an error signal;
   a compensation unit coupled to an output of the error amplifier, compensating the error signal and comprising a first resistor and a first capacitor, wherein the capacitor is coupled between the first resistor and a ground;
   a ramp generator, generating a ramp signal according to an on time signal;
   a first comparator coupled to the compensation unit and the ramp generator, wherein when the compensated error signal exceeds the ramp signal, the first comparator generates a trigger signal, wherein the compensation unit causes an included angle between the compensated error signal and the ramp signal to increase; and
   a PWM generator coupled to the first comparator, providing the on time signal according to the trigger signal, an input voltage of the DC-DC converter and the output voltage of the DC-DC converter.

2. The PWM controller as claimed in claim 1, wherein the PWM generator comprises:
   a current generating unit, providing a first current corresponding to the input voltage of the DC-DC converter when the trigger signal is triggered;
   a second capacitor coupled between the current generating unit and the ground, wherein the second capacitor is charged by the first current when the trigger signal is triggered; and
   a second comparator, comparing a voltage of the second capacitor with a voltage corresponding to the output voltage of the DC-DC converter to generate the on time signal.

3. The PWM controller as claimed in claim 2, wherein the PWM generator further comprises:
   a second resistor coupled to the ground;
   a first amplifier, having an first input terminal coupled to the second resistor, a second input terminal for receiving a first voltage corresponding to the input voltage of the DC-DC converter, and an output terminal;
   a transistor coupled to the second resistor, the first amplifier and the current generating unit, wherein the first current from the current generating unit flows to the second resistor through the transistor when the trigger signal is triggered, and the first current corresponds to the first voltage.

4. A constant on time PWM controller of a DC-DC converter, comprising:
   an error amplifier, receiving a reference voltage and a feedback voltage corresponding to an output voltage of the DC-DC converter to provide an error signal;
   a first comparator, comparing the error signal with a ramp signal to generate a trigger signal;
   a PWM generator coupled to the first comparator, generating a constant on time PWM signal according to the trigger signal, an input voltage of the DC-DC converter and the output voltage of the DC-DC converter; and
   a ramp generator, generating the ramp signal according to the constant on time PWM signal,
   wherein the PWM generator comprises:
   a current generating unit, providing a first current corresponding to the input voltage of the DC-DC converter when the trigger signal is triggered;
   a first capacitor coupled between the current generating unit and a ground, wherein the first capacitor is charged by the first current when the trigger signal is triggered; and
   a second comparator, comparing a voltage of the first capacitor with a voltage corresponding to the output voltage of the DC-DC converter to generate the constant on time PWM signal.

5. The constant on time PWM controller of a DC-DC converter as claimed in claim 4, further comprising:
   a compensation unit, compensating the error signal and causing an included angle between the compensated error signal and the ramp signal to increase.

6. The constant on time PWM controller of a DC-DC converter as claimed in claim 4, wherein the PWM generator further comprises:
   a resistor coupled to a ground;
   a first amplifier, having an first input terminal connected to the resistor, a second input terminal for receiving a first voltage corresponding to the input voltage of the DC-DC converter, and an output terminal;
   a transistor coupled to the second resistor, the first amplifier and the current generating unit, wherein the first current from the current generating unit flows to the resistor through the transistor when the trigger signal is triggered, and the first current corresponds to the first voltage.

7. The constant on time PWM controller of a DC-DC converter as claimed in claim 4, wherein the ramp generator comprises:
   a second amplifier having a first input terminal for receiving a second voltage, an second input terminal, and an output terminal;
   a first switch coupled to the second input terminal and the output terminal of the second amplifier;
   a current source;
   a second switch, coupled between the first switch and the current source, wherein the first switch and the second switch are controlled by the constant on time PWM signal; and
   a second capacitor coupled to the first switch and the second switch.

8. A constant on time PWM controller of a DC-DC converter, comprising:
   an error amplifier, receiving a reference voltage and a feedback voltage corresponding to an output voltage of the DC-DC converter to generate an error signal;
   a sense unit, generating a sense current corresponding to a loading of the DC-DC converter;

a compensation unit coupled to an output terminal of the error amplifier, generating a compensation signal according to the error signal and the sense current;

a first comparator, comparing the compensation signal with a ramp signal to generate a trigger signal;

a PWM generator, generating a constant on time PWM signal according to the trigger signal, an input voltage of the DC-DC converter and the output voltage of the DC-DC converter; and a ramp generator, generating the ramp signal according to the constant on time PWM signal.

9. A constant on time PWM controller of a DC-DC converter, comprising:

an error amplifier, receiving a reference voltage and a feedback voltage corresponding to an output voltage of the DC-DC converter to generate an error signal;

a sense unit, generating a sense current corresponding to a loading of the DC-DC converter;

a compensation unit, generating a compensation signal according to the sense current and a ramp signal, and comprising a first resistor and a first capacitor connected in series for compensating the error signal;

a first comparator, comparing the compensation signal with the error signal to generate a trigger signal;

a PWM generator, generating a PWM signal with a fixed turn-on time, wherein a frequency of the PWM signal is adjusted according to the trigger signal, an input voltage of the DC-DC converter and the output voltage of the DC-DC converter; and a ramp generator, generating the ramp signal, wherein the PWM generator comprises:

a current generating unit, providing a first current corresponding to the input voltage of the DC-DC converter when the trigger signal is triggered;

a second capacitor coupled between the current generating unit and a ground, wherein the second capacitor is charged by the first current when the trigger signal is triggered; and a second comparator, comparing a voltage of the second capacitor with a voltage corresponding to the output voltage of the DC-DC converter to generate the PWM signal.

10. The constant on time PWM controller of a DC-DC converter as claimed in claim 9, wherein the PWM generator further comprises:

a first amplifier, having an inverting input terminal coupled to a node, a non-inverting input terminal for receiving a first voltage corresponding to the input voltage of the DC-DC converter, and an output terminal;

a second resistor coupled between the node and the ground;

a transistor coupled between the node and the current generating unit, having a gate coupled to the output terminal of the first amplifier, wherein the first current from the current generating unit flows to the second resistor through the transistor when the trigger signal is triggered, and the first current corresponds to the first voltage.

11. The constant on time PWM controller of a DC-DC converter as claimed in claim 9, wherein the compensation unit further comprises:

a second resistor coupled between the sense unit and the ramp generator, wherein a voltage across the second resistor corresponds to the sense current, and the compensation signal is generated according to the sense current, the ramp signal and the voltage across the second resistor.

* * * * *